UNITED STATES PATENT OFFICE.

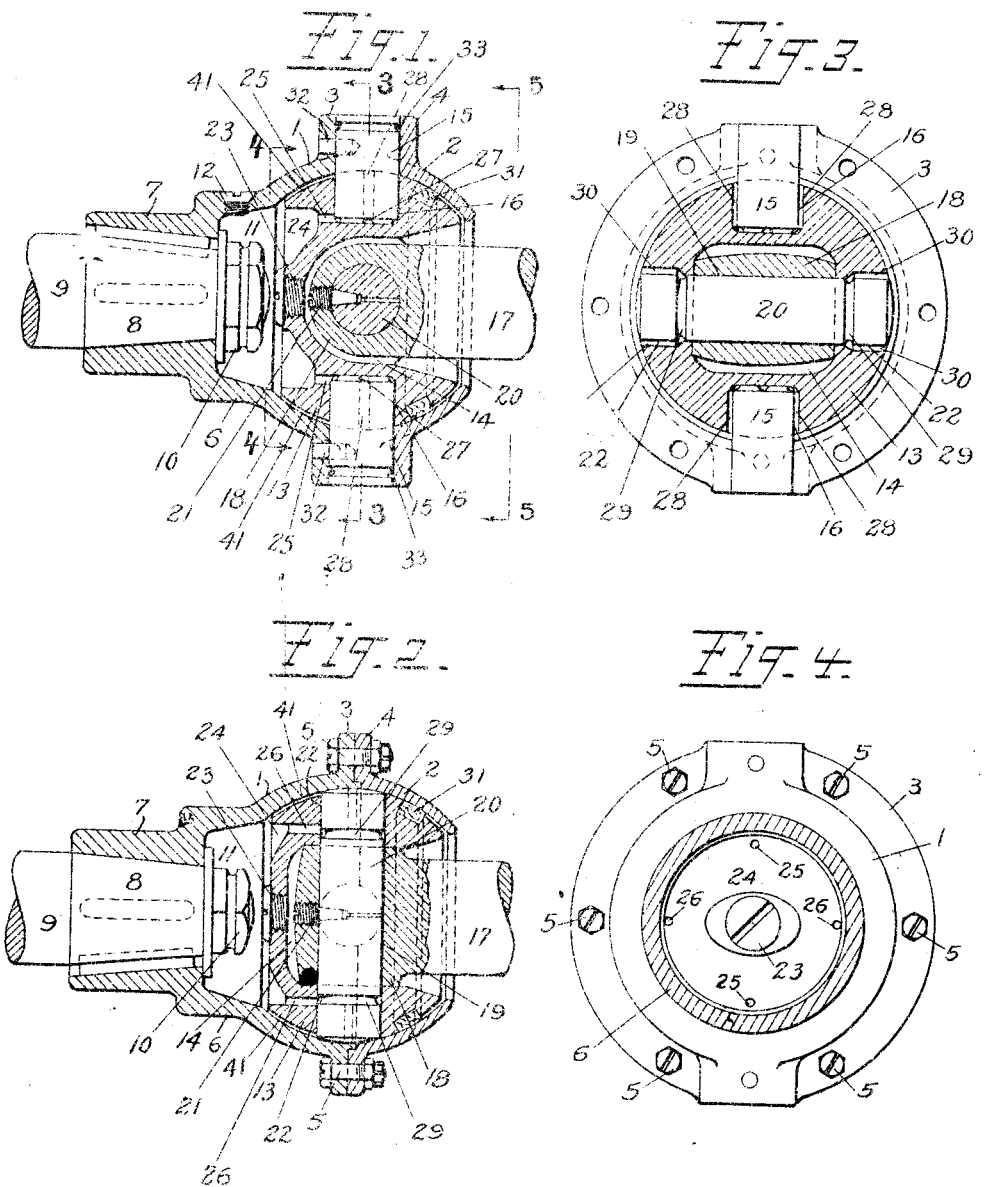

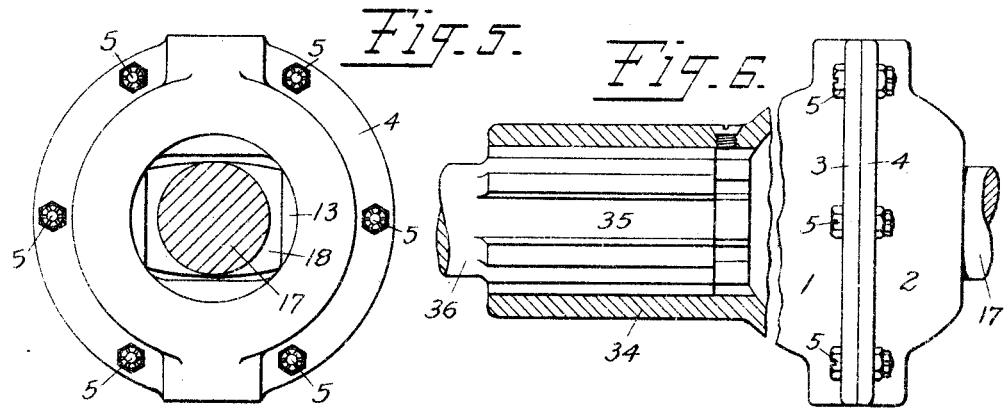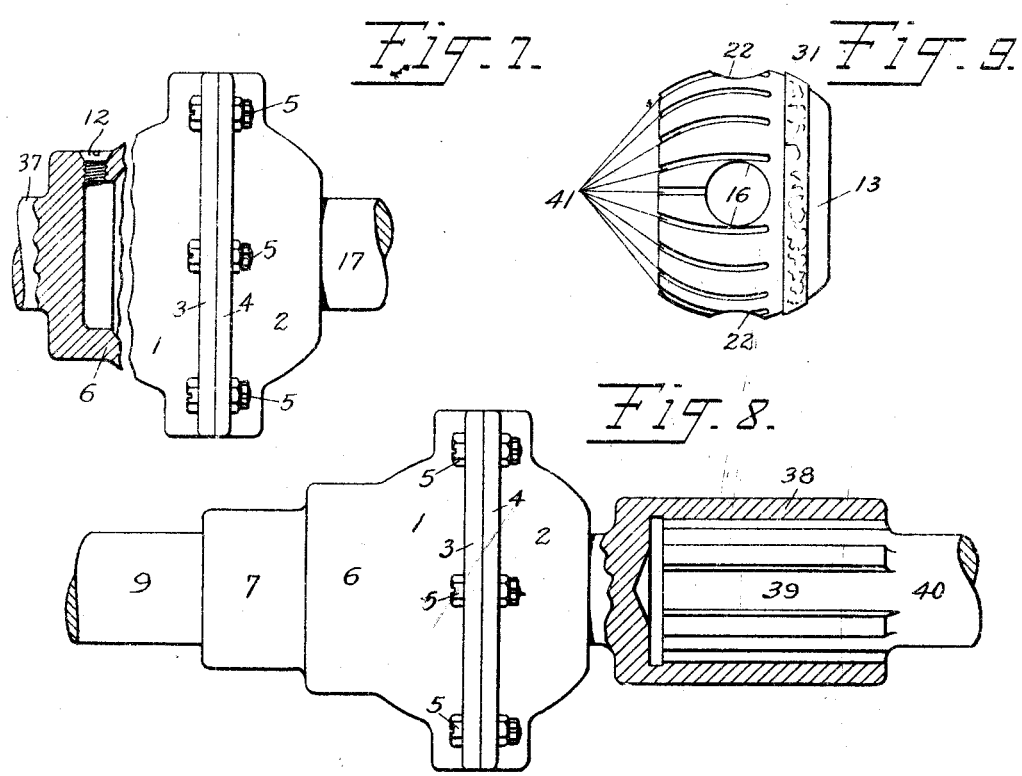

SYDNEY I. PRESCOTT, OF BROOKLYN, NEW YORK, ASSIGNOR TO MOTORFLEX EQUIPMENT COMPANY, OF NEW YORK, N. Y., A CORPORATION OF NEW YORK.

UNIVERSAL JOINT.

1,141,211.      Specification of Letters Patent.      Patented June 1, 1915.

Application filed January 27, 1913. Serial No. 744,424.

*To all whom it may concern:*

Be it known that I, SYDNEY I. PRESCOTT, a citizen of the United States, residing at Brooklyn, county of Kings, and State of New York, have invented a new and useful Improvement in Universal Joints, of which the following is a specification.

This invention relates to an improvement in universal joints.

The main defect of universal joints heretofore used, particularly those running at high speed, was the lack of thorough lubrication, the centrifugal force developed by the rotating joint operating to throw the lubricant away from the pivots or out of the device.

One of the main objects of the present invention is the production of a universal joint in which the centrifugal force developed by the rotating joint is utilized to force a lubricant to the wearing surfaces and retain it within the joint.

A further object is the production of a device of this character in which the relatively movable parts have large bearing surfaces without increasing the size of the joint as a whole.

Another object is the production of a device of this character which is simple, relatively inexpensive, not liable to derangement or excessive wear, and not subject to overheating.

Another object of the invention is the production of a universal joint especially adapted for connecting the tail shaft of the speed changing mechanism of an automobile with the propeller shaft of the same, said joint having a spherical surface adapted to resist the forward thrust of the rear driving axle thus eliminating the necessity for radius rods and torque tubes.

Another object is the production of a device of the character just mentioned in which a lubricant is forced to the bearing spherical surfaces by the centrifugal action of the rotating joint.

With these and other objects not specifically mentioned in view, the invention consists in certain constructions, combinations, improvement and parts which will be hereinafter fully described and then specifically pointed out in the claims hereunto appended.

In the accompanying drawings, which form a part of this specification and in which like characters of reference indicate the same or like parts, Figure 1 is a longitudinal sectional view of a device constructed in accordance with the invention. Fig. 2 is a longitudinal sectional view of the structure shown in Fig. 1, the section being taken at right angles to that of Fig. 1. Fig. 3 is a cross-sectional view taken on the line 3—3 in Fig. 1. Fig. 4 is a cross-sectional view taken on the line 4—4 in Fig. 1. Fig. 5 is an end view taken on the line 5—5 in Fig. 1. Figs. 6, 7 and 8 are general views partly in section, showing various modified forms of the device shown in Fig. 1. And Fig. 9 is an outside view of the oscillatory member of the joint showing the arrangement of lubricant grooves whereby the spherical surface is lubricated.

In carrying the invention into effect, there is provided a driving member, a driven member, an inclosed lubricant reservoir, an oscillatory member interposed between the driving member and the driven member at one end of the reservoir, pivots connecting the driving member and the oscillatory member, pivots connecting the driven member and the oscillatory member, and means coöperating with the reservoir for causing the centrifugal force developed by the rotating joint to force lubricant from the reservoir to and along all of the pivots. All of the elements enumerated above may be varied in construction within wide limits. In the best constructions, the means whereby the centrifugal force developed by the rotating joint forces lubricant to and along all of the pivots is carried by the oscillatory member, and means are also provided which coöperate with the oscillatory member to prevent lubricant from passing to the side of the oscillatory member opposite the reservoir. When these means are employed, they may also be varied in construction within wide limits.

In the device selected to illustrate the invention, means for utilizing the centrifugal force to lubricate the pivots includes a series of conduits formed in the oscillatory member and leading from the reservoir to and along the pivots; and the means for preventing lubricant from passing to the side of the oscillatory member opposite the reservoir consists of a packing ring sunk in the surface of the oscillatory member and wiping the inner surface of the driving member. In the device selected to illustrate the invention, the driving member and oscillatory member are both substantially spherical in form, the oscillatory member lying within the driving member with its center co-incident with the center of the spherical part of the driving member. It is to be understood that the device selected to illustrate the invention is but one of many possible embodiments thereof and that the invention therefore is not to be restricted to the precise details of the structure shown and herein described. The driving member of the joint selected to illustrate the invention consists of two parts marked 1 and 2, both being steel forgings and flanged respectively at 3 and 4. These flanges are held together by means of bolts 5 in a well-known manner. The main body of the driving member is substantially spherical but the part 1 has extended therefrom a short cylindrical section 6 which is reduced at 7 and the reduced end is keyed to the tapered end 8 of a shaft 9 in a well-known manner. The reduced end 7 of the driving member is forced on to the tapered end 8 of the shaft 9 by means of a nut 10 of well-known construction. The driving member is chambered at 11, the periphery of this chamber being inclined from the axis of the shaft 9 as clearly shown in Fig. 1. A screw plug 12 is provided which normally closes an aperture leading to the chamber 11 through which the lubricant may be readily introduced into said chamber. There is further provided an oscillatory member 13 which is substantially spherical and provided with a chamber 14 and which is preferably constructed of manganese bronze. This oscillatory member is located within the driving member with its center co-incident with the center of the spherical portion of said driving member. By an inspection of Fig. 1, it will be readily understood that the inner end of the oscillatory member 13 in coöperation with the chamber 11 of the driving member forms an inclosed lubricant reservoir at one end of the oscillatory member. Pivots are provided which connect the driving member with the oscillatory member and other pivots are provided which connect the oscillatory member with the driven member. As shown, there are two steel pivots 15 which are clamped between the two parts 1 and 2 of the driving member and journaled in suitable oppositely-disposed bearings 16 in the oscillatory member 13, the axes of these pivots and bearings lying in the transverse equatorial plane both of the driving member and of the oscillatory member. As shown, the driven member consists of a steel shaft 17 having a T-head 18 which is inclosed within the chamber 14 of the oscillatory member before referred to. This T-head is provided with a transverse aperture 19 in which is mounted a steel pin 20 held in place in a well-known manner by means of a set screw 21. The pin 20 projects beyond both ends of the T-head 18 to form oppositely disposed pivots which are journaled in suitable bearings 22 formed in the oscillatory member 13, the axes of both pivots lying in the transverse equatorial plane of the oscillatory member but at right angles to the axes of the pivots 15 before referred to. For the purpose of providing access to the set screw 21 through the rear wall of the oscillatory member, there is provided a screw plug 23 threaded in a suitable aperture in said rear wall and which may be readily removed to afford access to the set screw 21 when the device is dis-assembled.

The inner side of the oscillatory member 13 is provided with an annular channel 24 of varying depth and which is in open communication with the reservoir before referred to. From the deeper parts of this channel conduits 25 lead to the inner ends of the pivots 15 and from the shallower parts of the channel 24 conduits 26 lead to the pin 20. Each of the pivots 15 preferably has its inner end chamfered and provided with cross channels 27 which are in register with the conduit 25 leading to said pivot although in certain constructions the pivots 15 may be a little shorter than those shown so that their inner ends will not seat on the bottom of the bearing 16, and in that case no cross channels are required. Conduits or lubricant grooves 28 lead along the pivots 15, one on either side of said pivots, in the transverse equatorial plane of the oscillatory member. These grooves in connection with the cross channels 27 and conduits 25 afford a free passage for lubricant from the reservoir to and along the pivots 15 particularly at the point where the greatest thrust comes when the device is in operation in either rotative direction. The pin 20 is provided with two circumferential lubricant channels 29 in register with the conduits 26 leading to the pivots formed by the projecting ends of said pin. The oscillatory member 13 is provided with lubricant channels or conduits 30 leading along the pin pivots before described from the circumferential grooves 29 to the outer ends of the pivots, the conduits 30 lying in the transverse equatorial plane of the oscillatory member where the heaviest driving thrust occurs. It will be readily understood that the centrifugal force developed by the rotating joint tends to form the lubricant within the reservoir into an annular mass which is deflected laterally by the inclined walls of the chamber 11 into the annular groove 24 and thence through the conduits 25 and 26 to the pivots and along the conduits 28 and 30 so that as long as there is any lubricant within the reservoir, it will be forced to the pivots and cause the same to run in a bath of lubricant.

For the purpose of preventing the lubricant from passing to the side of the oscillatory member opposite the reservoir, there is provided a packing ring 31 sunk in the outer surface of the oscillatory member and wiping the inner surface of the two parts of the driving member. It will therefore be readily understood that oil forced through the conduits to and along the pivots cannot pass beyond the packing ring 31 irrespective of the oscillatory position of the packing ring.

For the purpose of preventing longitudinal or rotating movement of the pivots 15, there are provided dowel pins 32 driven into suitable apertures in part 1 of the driving member and seated in suitable apertures in the pivots 15 in a well-known manner.

For the purpose of preventing centrifugal force from throwing any lubricant out of the device which may pass along that portion of the pivots 15 clamped between the flanges 3 and 4 of the two parts of the driving member, each of said pivots is provided with a compressible packing ring 33 seated in a groove formed in the pivot adjacent its outer end and contacting with the surfaces between which the pivot is clamped.

In the modified form of joint shown in Fig. 6, the driving member is provided with an extension 34 slidably splined upon the enlarged end 35 of a driving shaft 36, the purpose of this construction being to provide for longitudinal movement as well as angularity of the driven shaft. In the modified form shown in Fig. 7, the driving member is formed integrally with the driving shaft 37. In the modified form shown in Fig. 8, the driven member carries a socket 38 splined upon the enlarged end 39 of a shaft 40, the object of this construction being to provide for longitudinal movement as well as angularity of either the driving or the driven shaft. Otherwise these modified forms are like the structure shown in Figs. 1 to 5 inclusive.

It is apparent that what has been herein termed the "driving member" may be the driven member and what has been herein termed the "driven member" may be the driving member; in other words, the device operates in exactly the same manner irrespective of the end to which the driving power is applied.

When the device is to be used to take the thrust of the driving axle of an automobile through the propeller shaft of the same, the spherical surface of the oscillatory member 13 is provided with a series of lubricant channels or conduits 41 through which the lubricant is forced by the centrifugal action of the joint to thoroughly lubricate the contacting spherical surfaces of the driving member and the oscillatory member.

In view of the foregoing, a detailed description of the operation of the device is deemed unnecessary and is therefore omitted in the interest of brevity.

What is claimed is:

1. In a universal joint, the combination with a driving member, of a driven member, an oscillatory member interposed between the driving member and the driven member and partially inclosed by the driving member in such manner that there is formed between the oscillatory member and the driving member an inclosed lubricant reservoir, pivots connecting the driving member and the oscillatory member, pivots connecting the driven member and the oscillatory member said parts being provided with means coöperating with the reservoir for causing the centrifugal force developed by the rotating joint to force lubricant from the reservoir to and along all of the pivots, and a packing ring sunk in the outer surface of the oscillatory member and wiping the inner surface of the driving member for preventing lubricant from passing to the side of the oscillatory member opposite the reservoir.

2. In a universal joint, the combination with a driving member, of a driven member, an oscillatory member interposed between the driving member and the driven member and partially inclosed by the driving member in such manner that there is formed between the oscillatory member and the driving member an inclosed lubricant reservoir, pivots connecting the driving member and the oscillatory member, pivots connecting the driven member and the oscillatory member, said oscillatory member having a series of conduits leading from the reservoir one to and along each of the pivots whereby the centrifugal force developed by the rotating joint forces lubricant from the reservoir to and along all of the pivots, and a packing ring sunk in the outer surface of the oscillatory member and wiping the inner surface of the driving member for preventing lubricant from passing to the side of the oscillatory member opposite the reservoir.

3. In a universal joint, the combination with a chambered two-part substantially spherical driving member, of a driven shaft having a T-head, a chambered substantially spherical oscillatory member inclosing the T-head of the driven shaft and located within the driving member, with its center co-incident with the center of the driving member and arranged to coöperate with the chamber of the driving member to form an inclosed lubricant reservoir at one end of the oscillatory member and provided with means coöperating with the reservoir for causing the centrifugal force developed by the rotating joint to force lubricant from the reservoir to and along all of the pivots, pivots clamped between the two parts of the driving member and journaled in the oscillatory member on its transverse equatorial plane, and a pin carried by the T-head of the driven shaft and projecting from both ends of said T-head to form pivots journaled in the oscillatory member on its transverse equatorial plane at right angles to the driving member pivots.

4. In a universal joint, the combination with a chambered two-part substantially spherical driving member, of a driven shaft having a T-head, a chambered substantially spherical oscillatory member inclosing the T-head of the driven shaft and located within the driving member with its center coincident with the center of the driving member and arranged to coöperate with the chamber of the driving member to form an inclosed lubricant reservoir at one end of the oscillatory member and provided with a series of conduits leading from the reservoir one to and along each of the pivots, pivots clamped between the two parts of the driving member and journaled in the oscillatory member on its transverse equatorial plane, a pin carried by the T-head of the driven shaft and projecting from both ends of said T-head to form pivots journaled in the oscillatory member on its transverse equatorial plane at right angles to the driving member pivots.

5. In a universal joint, the combination with a chambered two-part substantially spherical driving member, of a driven shaft having a T-head, a chambered substantially spherical oscillatory member inclosing the T-head of the driven shaft and located within the driving member with its center co-incident with the center of the driving member and arranged to coöperate with the chamber of the driving member to form an inclosed lubricant reservoir at one end of the oscillatory member and provided with a series of conduits leading from the reservoir one to and along each pivot, pivots clamped between the two parts of the driving member and journaled in the oscillatory member on its transverse equatorial plane, a pin carried by the T-head of the driven shaft and projecting from both ends of said T-head to form pivots journaled in the oscillatory member on its transverse equatorial plane at right angles to the driving member pivots, and a packing ring sunk in the outer surface of the oscillatory member and wiping the inner surface of the driving member, each of the driving member pivots having its inner end chamfered and provided with lubricant cross channels in register with the conduit leading to said pivot, and each of the driven member pivots having a circumferential lubricant channel in register with the conduit leading to said pivot.

6. In a universal joint, the combination with a chambered two-part substantially spherical driving member, of a driven shaft having a T-head, a chambered substantially spherical oscillatory member inclosing the T-head of the driven shaft and located within the driving member with its center co-incident with the center of the driving member and arranged to coöperate with the chamber of the driving member to form an inclosed lubricant reservoir at one end of the oscillatory member and provided with a series of conduits leading from the reservoir one to and along each pivot, pivots clamped between the two parts of the driving member and journaled in the oscillatory member on its transverse equatorial plane, a pin carried by the T-head of the driven shaft and projecting from both ends of said T-head to form pivots journaled in the oscillatory member on its transverse equatorial plane at right angles to the driving member pivots, a packing ring sunk in the outer surface of the oscillatory member and wiping the inner surface of the driving member, and a pair of compressible packing rings one between each driving member pivot adjacent its outer end and the surfaces between which it is clamped, each of the driving member pivots having its inner end chamfered and provided with lubricant cross channels in register with the conduit leading to said pivot, and each of the driven member pivots having a circumferential lubricant channel in register with the conduit leading to said pivot.

7. In a universal joint, the combination with a two-part substantially spherical driving member, of a driven member having a T-head, a chambered substantially spherical oscillatory member inclosing the T-head of the driven shaft and located within the driving member, pivots clamped between the two parts of the driving member and journaled in the oscillatory member, and a pin carried by the T-head of the driven member and projecting from both ends of said T-head to form pivots journaled in the oscillatory member, said parts being provided with means for forcibly lubricating the pivots.

In testimony whereof, I have signed my name to this specification in the presence of two subscribing witnesses.

SYDNEY I. PRESCOTT.

Witnesses:
 FRANK H. VICK, Jr.,
 ELIZABETH LOUISE RUSSELL.